United States Patent [19]
Niwa et al.

[11] Patent Number: 4,545,667
[45] Date of Patent: Oct. 8, 1985

[54] CAMERA WITH AUTOMATIC STROBE

[75] Inventors: Katsuhisa Niwa; Takahiro Ikeda, both of Osaka, Japan

[73] Assignee: West Electric Company, Ltd., Osaka, Japan

[21] Appl. No.: 545,280

[22] Filed: Oct. 25, 1983

[30] Foreign Application Priority Data

Oct. 25, 1982 [JP] Japan ................... 57-186942

[51] Int. Cl.⁴ ............................................. G03B 15/05
[52] U.S. Cl. ................................ 354/419; 354/149.11
[58] Field of Search ................... 354/145.1, 288, 419, 354/149.11

[56] References Cited
U.S. PATENT DOCUMENTS
4,472,042  9/1984  Iwata et al. .................. 354/149.11

Primary Examiner—L. T. Hix
Assistant Examiner—David M. Gray
Attorney, Agent, or Firm—Cushman, Darby & Cushman

[57] ABSTRACT

A camera with automatic strobe is provided with an electric motor which rotates only in a predetermined single direction, a motion transmitting apparatus comprising to spring means and an abutting means to transmit the energy of rotation to the strobe part with freedom of manual pushing of the strobe part and the motor is controlled by a motor drive control circuit which is configurated to prohibit a necessary motion of the strobe part and protrude the strobe part only for necessary occasion.

4 Claims, 4 Drawing Figures

CAMERA WITH AUTOMATIC STROBE

BACKGROUND OF THE INVENTION

1. Field of the Invention

The present invention relates to a camera with automatic strobe. The present invention particularly concerns wherein strobe part automatically protrudes when objective scenery brightness is of a brightness suitable for strobe flash photographing and automatically restores when the objective scenery brightness needs not strobe flash photographing.

2. Description of the Prior Art

Conventionally, a camera with automatic strobe is constructed such that objective scenery brightness is detected automatically by an automatic exposuring apparatus, and when the objective scenery brightness is darker than a predetermined level, the photographer is to handle a button to protrude a strobe part from a restoring position. However, such conventional construction requires a manipuration of the button and also it has a problem that the photographer is liable to forget to make the strobe part to protrude before photographing, thereby causing to produce an undesirable photographing in the next step.

Accordingly in recent years, there is a devicing of a camera with automatic strobe such that, when the objective scenery brightness is under a predetermined level, then strobe part is brought to a protruded position by means of an electromagnet or electric motor.

Furthermore, still improved devicing has been proposed such that proposed by the present assignee in the Japanese patent application Sho No. 56-101670 (Japanese published unexamined patent application Sho No. 58-2827), wherein the strobe part is automatically protruded for a photographing in a dark scenery and is automatically restored when the photographing is over.

However, in the above-mentioned camera with automatic strobe, almost of them utilizes spring action and electromagnet as moving the strobe part. For instance, in one type the restoration of the strobe part is made by a spring force against which the strobe part is held protruded by means of an engaging member linked to turn electromagneting mechanism, and such structure has a problem of considerable space and mechanism for the electromagnet. Another conventional example, such as, disclosed in Japanese published unexamined patent application Sho No. 56-87028 discloses an art where its strobe part is protruded and also restored both by a same electric motor by reversing its revolution by means of electric circuit. Such conventional structure has a problem of a rather complicated circuit connection for reversing operation of the motor and further has a problem that since the strobe part and the motor are mechanically linked, undesirable mechanical stress is impressed on the motor or gear means when an external force is applied to the strobe part.

Furthermore, the above-mentioned conventional examples have the problem that their motion of the strobe part is simply automatically made based on the automatic detection of the scenery brightness, but this is not fully convenient or satisfactory.

In the actual use, strobe part needs not be protruded when, for instance, lens food is put on the lens, the power switch is off or the photographer intends not to use the strobe for a particular photographic effect; but the conventional constructions are not prepared for such cases. Furthermore, when a photographic object is in a bright background and the scenery itself is bright, it is desirable to use the strobe even when those scenery brightness is high, and the conventional automatic strobe mechanism generally has not been prepared for such special cases.

Thus, the conventional camera with automatic strobe is not satisfactory.

SUMMARY OF THE INVENTION

The primary purpose of the present invention is to provide an improved camera with automatic strobe wherein a strobe part and an electric motor to move position of the strobe part are mutually linked not by a direct connection, but by a special link means having two energizing means to allow manual moving of strobe part when desired thereby eliminating mechanical problem which is likely to be induced by forced manual operation of the strobe part.

Another purpose of the present invention is to enable various operations of the strobe part.

A camera with automatic strobe in accordance with the present invention comprises:

- a first energizing member for driving the strobe part in a direction to protrude out of a camera body,
- a second energizing member for driving the strobe part to restore into the camera body surpassing a force of the first energizing member,
- a driving lever fulcrumed on the camera body in a manner that a first part thereof being energized in a predetermined direction by the second energizing member and a second part thereof being abutting a receiving part of the strobe part thereby to energize the strobe part in the direction to restore it into the camera body,
- a cam which is to be rotated in a predetermined rotary direction only, thereby to drive the driving lever against the energizing force of the second energizing member, to allow a restoration of the strobe part into the camera body by the force of the second energizing member at a first predetermined rotary phase period of the cam, and to allow a protrusion of the strobe part out of the camera body by the force of the first energizing member at a second predetermined rotary phase period of the cam,
- a reversing-prohibition means which prohibit reversing rotation of the cam when the strobe part reaches the protruded position,
- a lever stopping means which prohibit motion of the lever in a direction opposite to the predetermined direction when the strobe part is in the restored position,
- an electric motor for driving the cam, and
- a motor drive control circuit for actuating the motor responding to plural input signals of photographic condition.

DESCRIPTION OF THE PREFERRED EMBODIMENT

Figure 1A:
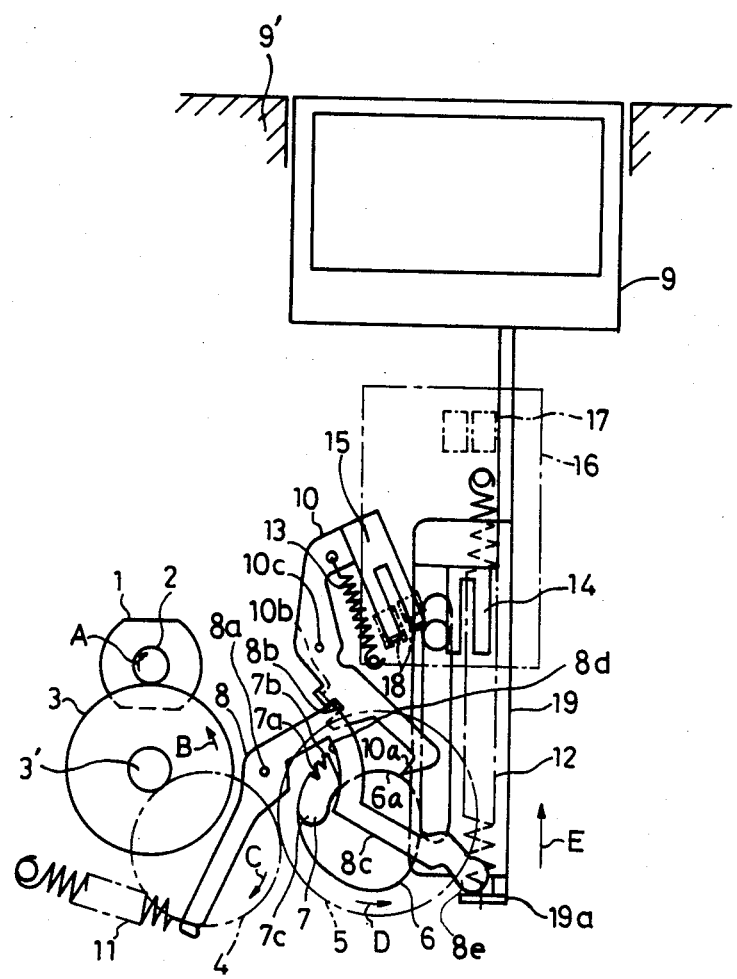
FIG. 1(a) is a sectional side view of mechanical structure for driving a strobe part in a camera embodying the present invention, which is at a state when the strobe part is restored in a body of the camera and drawn with insulation board 16 and some gears removed for easy understanding.
Figure 1B:
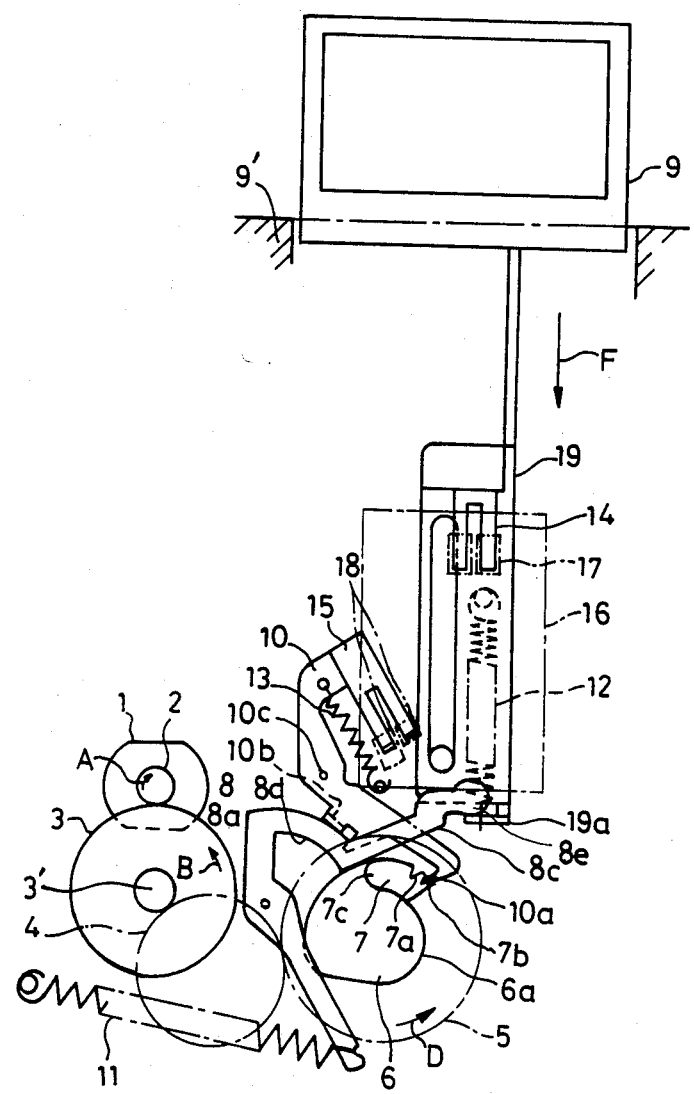
FIG. 1(b) shows a sectional side view of the same camera at another state where the strobe part is pushed up ready for a strobe flashing, and drawn in the similar manner to FIG. 1(a).
Figure 1C:
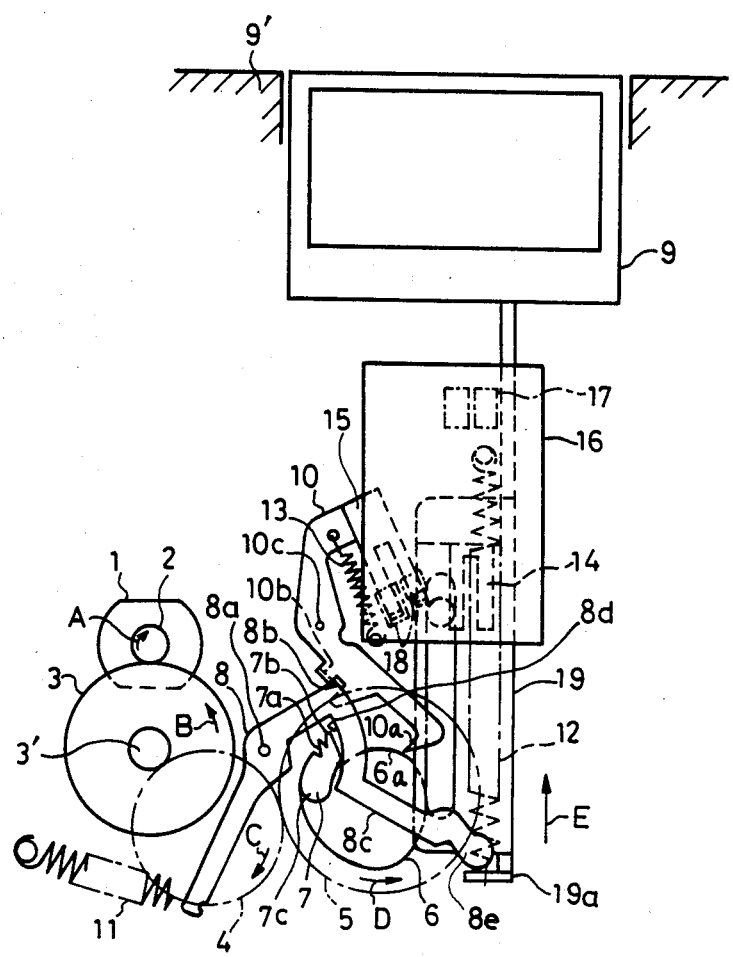
FIG. 1(c) is a sectional side view corresponding to the state of FIG. 1(a), but drawn with the insulation board 16 and some gears as they are there.

FIG. 1(a), FIG. 1(b) and FIG. 1(c) show mechanical configuration of an essential part of a camera with automatic strobe and FIG. 1(a) and FIG. 1(c) show the state where the strobe part 9 is inside i.e. restored in a camera body 9', and FIG. 1(b) shows the state where the strobe part 9 is protruded out of the camera body 9', pinion gear 2 fixed to a shaft of an electric motor 1 engages with a reduction gear 3 and a transmission gear 4 engages with another pinion gear 3' which is coaxially fixed to the reduction gear 3 . A cam gear 5 engages with the transmission gear 4 and has a cam 6 fixed thereon. A protruded part 7 is provided on the cam 6 and has several engaging indents 7a and 7b. A lever 8 is fulcrumed by a shaft 8a on a camera body, and its cradling motion is limited by a limiting member 10 which is fulcrumed by a shaft 10c. An end of the lever 8 is pulled by an energizing member, for instance, a tension spring 11 which gives the lever 8 a clockwise turning force. The strobe part 9 is held on a sliding rod 19 which is slidably held on the inner wall of the camera body, and is energized by another energizing means, for instance, a tension spring 12, so that the tension spring 12 pulls the strobe part 9 upwards. A receiving part 19a is formed on the sliding rod 19 for receiving a pushing end 8e of the lever 8, so that by means of the tension spring 11 the lever 8a turns clockwise and pushes down the receiving part 19a. The tension spring 11 is selected to have a strong tension so that it surpasses the tension of the tension spring 12 and pushes down the receiving part 19a by the pushing end 8e of the lever 8. A moving contact 14 is provided on the sliding rod 19 and together with fixed contact 17 constitutes a power switch of the strobe part. Another moving contact 15 is provided on the limiting member 10 and together with fixed contact 18 constitutes another switch, so that protruding motion of the strobe part 9 is detected by this switch. Fixed contacts 17 and 18 which are for contacting with the moving contacts 14 and 15, respectively, are provided on an insulation board 16 fixed on the camera body 9'.

Operation of the above-mentioned mechanical structure is described hereafter. When the electric motor 1 is actuated by a signal, the motor 1 rotate clockwise as shown by arrow A. When the motor rotates clockwise, the pinion gear 2 also rotates clockwise. The rotation is transmitted to the reduction gear 3, transmission gear 4 and to the cam gear 5, and they rotates anti-clockwise, clockwise and anti-clockwise, respectively, as shown by arrows B, C and D. When the cam gear 5 rotates in the anti-clock direction D, the cam 6 rotates also anti-clockwise, and therefore a nail shaped end 10a of the limiting member 10 relatively slides along the round periphery of the cam 6. The limiting member 10 is energized clockwise by a spring 13 in a manner that the nail shaped end 10a touches on the periphery of the cam 6. As the limiting member 10 slides along the periphery of the round part of the cam 6, the nail shaped end 10a of the limiting member is pushed upward by the round periphery of the cam 6 and the limiting member 10 is slightly turned anti-clockwise. Accordingly, an engagement between an indent 10b of the limiting member 10 and a protrusion 8b of the lever 8 is disengaged. Then by that slight motion of the limiting member 10, the moving contact 14 touches the fixed contact 18 and an electric signal to indicate a releasing of the strobe part 9 to be pushed upwards by the tension spring 11. The signal is to be used as described later, for indicating that the strobe part 9 is ready to be pushed up.

As the motor 1 further rotates, the cam 6 further rotates anti-clockwise, and a protrusion 7c pushes up a straight part 8c of the lever 8 by means of motor driving force. Since the motor rotation force is stronger than the force by the spring 11, the lever 8 is turned anti-clockwise against that energizing force of the spring 11. By pushing up of the straight part 8c of the lever 8 by the protrusion 7c of the cam, the lever 8 turns anti-clockwise, and its right end part, which is pushing down the receiving part 19a goes up, and therefore, the sliding rod 19 of the strobe part is allowed to go up by the force of the tension spring 12 and pushes up the strobe part 9, as shown in FIG. 1(b).

As shown in FIG. 1(b), the strobe part 9 is protruded out of a camera body 9' and is ready for flashing.

At this time, the switch 14 provided on the sliding rod touches the fixed contact 17 and power circuit of the strobe part 9 is switched thereby.

The signal from the switch 14 is also utilized as a signal to stop the motor rotation, and therefore the motor stops at that phase of rotation. Also at this phase of the rotation of the cam, the nail shaped end 10a of the limiting member 10 engages with the indent 7b of the protrusion 7 of the cam 6. By this engagement, a reverse rotation of the cam 6 in clockwise direction by being pressed by the straight part 8c on the protrusion 7 based on the strong tension of the spring 11 is prohibited. Accordingly, once the cam 6 turns to such position the position of the lever 8 is fixed against the energizing force of the spring 11, so that the strobe part 9 is held protruded by the tension spring 12, and has a flash-ready position, which is one of two stable positions of the strobe part.

Nextly, the operation from the protruded state of FIG. 1(b) to the restored state of FIG. 1(a) is described. Firstly, by an operation of the motor driving circuit, a driving signal is given to the motor 1, and therefore the motor 1 further rotates in the arrow A, and therefore the cam 6 rotates further in the direction of arrow D. As a result, the engagement of the nail shaped protrusion 10a on the indent 7b is disengaged and the cam rotates anti-clockwise, and then the protrusion 7 passes the straight part 8c of the lever 8, and falls in the arch shaped recess 8d of the lever 8. And therefore, the lever quickly turns clockwise and pushes down the sliding rod by the pushing end 8e by means of the force of the tension spring 11. Thus the strobe part 9 is pulled in and restored in camera body 9'. Then, when the strobe part 9 reaches its restored position, the switch 15 is turned off by means of the moving contact 18 and gives a signal to the motor driving circuit to stop the motor 1, thereafter. Thus, the mechanism of the strobe driving apparatus reaches a restored state, which is the other stable position.

As has been described, the feature of the present invention exists in that the electric motor 1 turns in a single direction even for the opposite operations, namely, strobe part protrusion operation and strobe part restoration operation.

Since the motor rotation is in the same direction, it is possible that, by providing a shift gear system which can shift the gear chain in a manner that, in normal rotation the rotation of the electric motor 1 is transmitted to the cam gear 5 only, and when the rotation of the electric motor 1 is reversed the transmission of the rotation to the cam gear 5 is disconnected and the rotation is transmitted in another system. Thereby, the motor can be utilized for two different mechanism.

And important feature of the present invention is that the pushing end 8e of the driving lever 8 and the receiving part 19a of the sliding rod 19 is in an abutting relation. Therefore, the strobe part 9 can be manually pushed down into the restored position without harming the mechanical linkage. This enables, for instance, a willful disuse of the strobe part even for a dark objective scenery, intending a special photographic effect. That is, as later described with reference to the motor driving circuit operation, by pushing the strobe part 9 the switch 14+17 is turned off, thereby giving the motor driving circuit a signal to actuate the electric motor 1, thereby changing the state to the restored state of FIG. 1(a). This pushing down of the strobe part 9 is only for initiation of the downward operation of the strobe part, and accordingly, the actual restoration of the strobe part is made by the rotation of the electric motor 1 and therefore no undesirable mechanical stress is given to the mechanical system.

Figure 2:
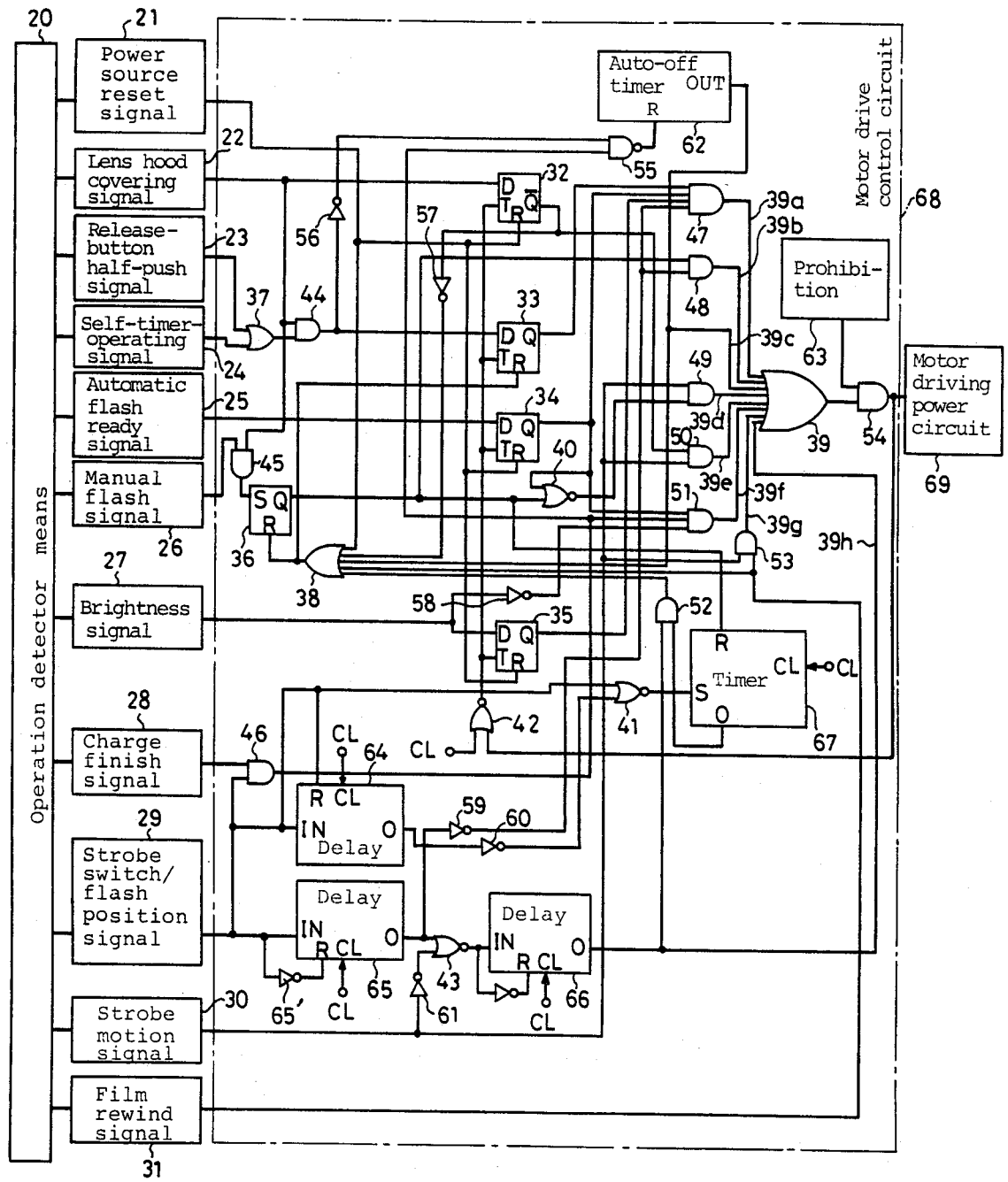
FIG. 2 is a circuit diagram of an example circuit for driving the electric motor of the configuration shown in FIG. 1(a), FIG. 1(b) and FIG. 1(c).

Electric configuration of the above-mentioned embodiment is elucidated hereafter with reference FIG. 2.

In the circuit of FIG. 2, a block 20 schematically shows operation detector means which issue various detection signals from various parts of the camera, for instance, from switch 14+17 or switch 15+18, and the operation detector means issue signals shown in block 21, 22, 23, 24, 25, 26, 27, 28, 29, 30 and 31, as follows.

A power source reset signal 21 is issued when the camera circuit is electrified from the power source, and the signal is normal L, and when it becomes H resets related circuits. Lens hood covering signal 22 is issued when the lens is covered by a lens hood or lens shelter, and issues H level when the hood is removed. A release-button half-push signal 23 is issued when a shutter release-button is half-pressed and issues H level signal when the button is half-pressed. A self-timer-operating signal 24 issues H signal when a self-timer is set. An automatic flash ready signal (or automatic protrusion mode signal) 25 is issued when the strobe part 9 is pushed up and the circuit is ready for automatic flashing as a result of completion of various conditions for the automatic flashing, and becomes H level when the condition is ready. A manual flash signal (or manual protrusion mode signal) 26 is issued when a manual strobe part protrusion mode is selected irrespective of the above-mentioned various conditions and becomes H level when the strobe part is protruded. In this example, of course, a long time exposure without protruding the strobe part is selectable, and in such case, both the automatic flash ready signal 25 and the manual flash signal 26 are made in L levels by a special manual signal, for example by closing a switch. A manual mode selection can be made for selection between modes of manual forced protrusion by the manual flashing signal 26, automatic flashing by the automatic flashing signal 25 and a forced non-flash photographing by said special manual signal, and these three signals are comprehensively referred to as a manual mode selection signal. A brightness signal 27 is issued when the brightness of objective scenery is lower than a predetermined level and becomes H level for such state. A charge finish signal 28 is issued when the strobe part has been finished of charging, and becomes H level for such state. A strobe switch/flash position signal 29 shows state of the strobe power switch and becomes H when the strobe power switch is ON. This signal is also used as a signal to indicate protruding of the strobe part 9 since the switch 14+17 is used to generate this signal. A strobe part motion signal 30 is issued from the switch 18+15 and is a signal showing the state of operation of the strobe part and becomes H when the switch 18+15 is closed. This signal can be also as a signal to detect that the strobe part 9 is in restored position or not. A film rewind signal 31 is a signal issued when a film is in a rewinding state, and becomes H when the rewinding is over. Numerals 32, 33, 34 and 35 designate D-flip-flops, numeral 36 designates S-R-flip-flop, numerals 37, 38 and 39 designate OR gates, numerals 40, 41, 42 and 43 designate NOR gates, numerals 44, 45, 46, 47, 48, 49, 50, 51, 52, 53 and 54 designate AND gates, numeral 55 designates NAND gate, numerals 56, 57, 58, 59, 60 and 61 designate inverters, numeral 62 designates an auto-off timer circuit which issues H level signal when a strobe flashing operation is ready but no flashing is made. Numeral 63 designates a motor drive prohibition circuit for prohibiting driving of the motor 1 by issuing H level signal. Numeral 64, 65 and 66 designate delay circuits. Numeral 67 designates timer circuit, numeral 68 comprehensively designates the motor drive control circuit constituted with the above-mentioned components designated by the numerals 32 through 67. Numeral 69 designates a motor driving power circuit which is for feeding necessary power to the electric motor 1, when a H level signal is fed thereto.

Electric operation of the circuit of FIG. 2 is described in detail hereafter.

Firstly, operations of the D-flip-flops 32-35 and S-R-flip-flops 36 are described. D-flip-flop 32 receives the power source reset signal 21 at its reset terminal R, and the lens hood covering signal 22 at its input terminal D and clock pulse signal which is generated by appropriate frequency-dividing from a reference clock generator to its timing input terminal T through the NOR gate 42. Accordingly, when a photographing is intended, the power switch is turned on and lens hood is removed and accordingly, the power source reset signal 21 is in H level, and the lens hood covering signal is also H level. Accordingly an L level output signal is issued from the output terminal $\overline{Q}$ at the fall timing of the clock pulse.

The D-flip-flop 33 is connected by its reset terminal R to the OR gate 38 which is fed with the power source reset signal 21, by its input terminal D to the AND circuit 44 which is fed with the lens hood covering signal 22, and also by its timing terminal T to the output terminal of the NOR circuit 42. When photographing, either a manual releasing or self timer releasing is carried out, either of the release button half push signal 23 or the self timer signal 24 is in H level, and moreover, the power source reset signal 21 and the lens hood covering signal 22 are both in H level, therefore an H level output signal is issued from the output terminal Q of the D-flip-flop 33 at a fall timing of the clock pulse.

D-flip-flop 34 is connected by its reset terminal R to the power source reset signal 21, by its data input terminal D to the automatic flash ready signal 25 and by its timing terminal T to the output of the NOR gate 42, respectively. In this circuit, when a photographing is about to be carried out, when an automatic flash ready state is set, an H level signal is issued from the output terminal Q at a fall timing of the clock pulse, like the D-flip-flop 33.

The D-flip-flop 35 is connected by its reset terminal R to the power source reset signal 21, by its data input terminal D to the brightness signal 27 and by its timing terminal T to the NOR circuit 42, respectively. Accordingly, when a photographing is intended, and the objective scenery brightness is low, a H level output signal is issued from its output terminal Q at fall timing of the clock pulse.

The S-R-flip-flop 36 is connected by its reset terminal R to the power source reset signal and by its set terminal S to the output terminal of the AND circuit 45 which is fed by the manual flash signal 26 and the lens hood covering signal 22. Accordingly, when a photographing is intended and a manual protruding of the strobe part 9 is selected once, that is, the manual flash signal becomes H level even only once, the output terminal Q continues to issue H level output signal until the reset terminal R receives an H level signal.

The delay circuits 64, 65 and 66 operate as follows. These delay circuits have input terminals I, reset terminals R, clock terminals CL and output terminals O. In each circuit, reset state is released when an L level signal is fed to the reset terminal R and the input signal fed to the input terminal I is transmitted to the output terminal O being delayed for a delay time decided by the clock signal given to the clock terminal CL.

The delay circuit 64 is connected by both input terminal I and reset terminal R to the strobe switch/flash position signal 29, and when the strobe switch/flash position signal 29 is at L level, an L level output signal is issued from its output terminal O with a delay time decided by the clock signal; and when the input signal 29 becomes H level then in this time the output terminal O immediately issues H signal without delay since the reset terminal R receives a reset signal.

All the delay circuits 64, 65 and 66 are connected to receive an H level reset signals at every switch-on of the power switch, though not shown of the actual connection in the drawing of FIG. 2.

The delay circuit 65 is connected to receive by its input terminal I the same signal as that of the delay signal 64, but its reset terminal R is connected to receive the same signal via an inverter 65'. Accordingly, when the output signal of the strobe switch/flash position signal 29 is L level, the delay circuit 65 is reset, and immediately issues L level output signal from its output terminal O. But, when the above-mentioned signal 29 becomes H level, then the output terminal becomes H level with a delay determined by the clock pulse, since the reset is released.

As is obvious from the above-mentioned description, the delay circuits 64 and 65 issue outputs responding to the same input signal from the strobe switch/flash position signal 29, but their output timing is different. That is, the delay circuit 64 issues output at the timing when the signal of the circuit 29 turns from H to L but the delay circuit 65 issues output at the timing when the input signal from the circuit 29 turns from L to H.

Since the strobe switch/flash position signal 29 becomes H when the switch 14+17 closes as described of FIG. 1, the above-mentioned turning from H to L and L to H corresponds to the timings of protruding up and restoring down of the strobe part 9, respectively.

The delay circuit 66 is connected by its input terminal I to the output terminal of the NOR gate 43 which is fed with output signal of the delay circuit 65 and output terminal of the inverter 61 which inverts the strobe motion signal 30. Accordingly, when the strobe switch/flash position signal 29 is in L level, and the delay circuit 65 issues L signal and also the strobe motion signal 30 is H level, then NOR gate 43 issues H level output. Accordingly, the delay circuit 66 issues H level output from its output terminal O with the delay determined by the clock signal.

The clock pulses to be given to the clock pulse terminal CL of the delay circuit 64, 65 and 66 should be different depending on their function.

The functions of the delay circuits 64, 65 and 66 are as follows. That is, the delay circuit 64 makes a necessary delay period for use in other circuits. The delay circuit 65 serves to delay stopping of the rotation of the electric motor 1 from the timing of a touching of the contacts 14 and 17 until the touching becomes perfect. The delay circuit 66 delays for a predetermined period, in order to examine whether a motion from the protruded position to the restoring position is really an intended one by the photographer or not, in order to omit accidental signal due to a short departing of the contacts 14 and 17 from an intended signal. For the above-mentioned purposes, the delay circuit 64 has a delay time of about several m sec., and the delay timer 65 has a delay time of about 40 m sec., and the delay timer 66 has a delay time of about 200 m sec.

The auto-off timer circuit 62 is connected and works as follows. The auto-off timer 62 is connected by its reset terminal R to the output terminal of the NAND gate 55, and at turning to H level of the output of the NAND gate 55 the time-counting is reset, to restore the circuit 62 to the initial state.

The NAND circuit 55 is connected to receive output of the AND gate 44 through an inverter 56 and output of an AND gate 46. Therefore the NAND gate 55 issues H level output only when both the release button half-push signal 23 and the self-timer operating signal 24 are in L level, the strobe switch/flash position signal 29 is in H level, and the charge flash signal 28 are also in H level. Accordingly, the auto-off timer 62 starts to count only under the condition that the strobe part 9 is ready for flashing and no photographic action, namely release-button full pressing, is made.

The timer circuit 67 is connected by its reset terminal R to the output terminal of the S-R-flip-flop 36, and by its set terminal S to the output terminal of the NOR circuit 41 and by the clock terminal CL to a clock pulse. Accordingly, when its reset terminal R is fed with H level signal, the timer circuit 67 starts time counting. And after completion of a predetermined time counting issues H level signal to its output terminal O. And when an H level signal is fed to its set terminal S, the output terminal O immediately issues H level signal irrespective of the time counting operation.

As is obvious from the circuit of FIG. 2, the motor driving circuit 69 starts driving of the electric motor 1, when the output signal of the AND gate 54 becomes H, and actuates the motor, unless a motor drive prohibition circuit 63 issues a prohibition output of L level, upon turning of the output of the OR gate 39 to H level.

The condition of making the output of the OR gate 39 to H level is that either one input signal to the OR gate 39 becomes H level, the OR gate 39 issues output signal to the AND gate 54. That is, unless there is no prohibition signal from the prohibition circuit 63, at receptions of any one input signal of H level the motor 1 starts its rotation. The prohibition circuit 63 serves to stop the motor, in some necessary cases, for instance, the common power source (dry cell) is feeding a large current for motorized film winding, automatic focussing motor, zoom-lens motor, or the like, since in such case no accurate brightness measuring for pop-up the strobe part is expectable.

In the camera in accordance with the present invention, the strobe part 9 protrudes and restores by rotation of the electric motor 1 in a single direction.

The strobe part 9 is protruded or restored by various signals and operation of various circuits at the timing when the OR gate 39 receive the H level input signal.

Hereinafter operation of the circuit of FIG. 2, which is an example of an actual operation circuit for the camera with automatic strobe is shown in FIG. 1(a) through FIG. 1(c). As has been elucidated, the operation of the strobe part 9 is substantially depending on the states of input signals into the OR gate 39, accordingly the following elucidation is made on the states of the signals on the input lines 39a, 39b, 39c, 39d, 39e, 39f, 39g and 39h.

The input line 39a is connected to the output terminal of the AND gate 47, and the AND gate 47 receives output signals from the D-flip-flops 33, 34 and 35, and the output of the inverter circuit 59, and when all these outputs become H level, the AND gate 47 issues H level signal. As a result, the OR gate 39 issues an H level output. The D-flip-flops 33, 34 and 35, and the inverter circuit 59 issue H level signals when the signals shown in blocks 21 through 31 are in the following conditions. This is the case when the power source reset signal 21 is H, the lens hood covering signal 22 is H, the release button half-push signal 23 or self-timer operating signal 24 is H, the automatic flash-ready signal 25 is H, the brightness signal 27 is H, and strobe switch/flash position signal 29 is L. Such conditions are that when the strobe part is restored in the camera body, and photographer operates the camera to take a photograph, by switching on the power switch, removing the lens hood and selecting in automatic flash ready signal mode. And thereafter, by means of release-button half pushing or by self-timer operation the objective scenery brightness is measured, and the measured brightness is lower than a predetermined level. That is, in short, in an automatic photographing for a dark objective scenery, the strobe part is pushed up to the protruded position.

Then, output H level signal of the AND gate 54 is fed, besides to the motor driving circuit 69, to an input signal of the NOR gate 42, so as to prohibit impressing of clock pulses to D-flip-flops 32 through 35 when the motor driving circuit 69 is actuated.

Accordingly, D-flip-flop 32 through 35 continue to issue the H level output signals from their output terminals Q during the while the motor 1 is driven, irrespective of any change of input signals to their input terminals D. As a result of the above-mentioned operation, when the strobe part 9 is protruded from the restoring position as shown in FIG. 1, firstly the switch 15+18 closes and the strobe motion signal 30 is changed from previous L to H. And thereafter at completion of the protrusion, the strobe switch/flash position signal 29 is turned from hitherto L level to H level by closing of the switch 14+17. When the strobe switch/flash position signal 29 changes from L to H, the delay circuit 65 is released of its reset state by receiving an L level signal at its reset terminal R. Accordingly, after a delay time, for instance, about 40 m sec., the output terminal O of the delay circuit 65 issues an H level output. Then the H output level of the delay circuit 65 is given to one input terminal of the AND gate 47 through the inverter 59, so that the signal from the inverter 59 turns from hitherto H level to L level. Accordingly, the output of the AND gate 47 turns to L level and makes the motor driving circuit 69 cease the output signal to motor 1, thereby to stop the motor.

That is, when the strobe part 9 is protruded thereby closing the switch 14+17 and makes the strobe switch/flash position signal to H, then after a lapse of the delay time of the delay circuit 65, the motor rotation is stopped. Incidentally the delay circuit 65 also provides a delay time which serves to certainly closes the switch 14+17 as described above.

Next, signal on the input line 39b is elucidated. The input line 39b is connected to the output line of the AND gate 48, and the input terminals of the AND gate 48 are connected to the output terminal of the S-R-flip-flop 36 and the output terminal of the inverter 59. Accordingly, when the output signals of the S-R-flip-flop 36 and the inverter 59 both become H level, alike the previous case the OR circuit 39 issues H level signal.

The above-mentioned output signals of the S-R-flip-flop 36 and the inverter 59 respectively become H level under the following conditions. That is, when the lens hood covering signal 22 is H level, the manual flash signal 26 is H level and the strobe switch/flash position signal 29 is L level. Such condition corresponds to a case when the strobe part 9 is in the restored position, the power source is connected, the lens hood is removed and the manual protrusion mode is selected.

That is, by handling any switch operation to select the manual operation of the strobe, the restored strobe part 9 can be protruded.

Like the operation by the previously described AND gate 47, the motor driving by the AND gate 48 is controlled to continue a while by delaying the stop by means of the delay circuit 65, after the strobe part certainly is protruded and the strobe switch/flash position signal 29 becomes H level. Namely, the lens hood covering signal 22, the release-button half-push signal 23, the self-timer operating signal 24, the manual mode selection signal 26, the brightness signal and the strobe/flash position signal are given selectively to the above-mentioned two AND gates 47 and 48. This group of AND gates detects the protusion of the strobe part and causes the electrical motor to rotate.

Next, the signal on the input line 39c is described. The input line 39c is connected to the output terminal of the auto-off timer 62, so that when the auto-off timer 62 issues H level signal the OR gate 39 issues H level signal. As previously described, the auto-off timer 62 issues H level signal when a predetermined time, for instance one minute, is counted from a reception of the charge finish signal 28 and when release button half push signal 23 and the self-timer operating signal 24 are both L level. Accordingly, the OR circuit 39 operates to restore the strobe part from the protruded position to the restored position when the strobe part 9 is once protruded and its circuit is connected ready for use but actually is not used, thereby to save waste of energy.

Next, the signal on the input line 39d is described. The input line 39d is connected to the output terminal of the AND gate 49. Accordingly, when two input terminals of the AND gate 49 become H level, then the signal on the input line 39d becomes H level. To one of the input terminal of the AND gate 49 the strobe motion signal 30 is given, and to another input terminal of the AND gate 49 the output signal of the NOR gate 40 is given. The NOR gate 40 receives at its input terminal the output signals of the D-flip-flop 34 and S-R-flip-flop 36. However, as has been previously described, these two flip-flops are receiving automatic flash-ready signal 25 and the manual flash signal 26, respectively. And in usual photographing, either one mode is selected, accordingly output of one of these flip-flops are of H level.

Accordingly the output signal of the NOR gate 40 is usually at L level, and is made H level only when such particular mode is selected that neither the automatic flash-ready signal 25 nor the manual flash signal 26 does not exist, that is the strobe part 9 is not used and instead a long period exposure mode is selected.

On the other hand, the strobe motion signal 30 becomes H level when the strobe part 9 starts to be protruded as has been with reference to FIG. 1.

Accordingly the AND gate 49 issues H level signal to drive the motor 1 when a long period exposure is selected, both the automatic flash ready signal 25 and manual flash signal 26 are both L level and the strobe part is protruded to issue the strobe motion signal 30 of H level. And by the motor driving, the protruded strobe part 9 is restored in the camera body 9'.

Next, the signal on the input line 39e is described.

The input line 39e is connected to the output terminal of the AND gate 50, accordingly when both the input terminals of the AND gate 50 become high level, the signal on the input line 39e becomes H level. One input terminal of the AND gate 50 is connected to the inverse output terminal $\overline{Q}$ of the D-flip-flop 32, and the other input terminal is connected to the strobe motion signal 30. As has been described, when the lens hood covering signal 22 is low level, which represents impossibility of the photographing, the D-flip-flop 32 issues H level signal to the AND gate 50. On the other hand, the strobe motion signal 30 is H, once the strobe part 9 is projecting even a little. Accordingly the AND gate 50 issues H level signal when the strobe part 9 is moving to protrude and the lens hood is covering the lens, thereby making the motor 1 rotate. This driving of the motor 1 makes the AND gate 50, alike the output signal of the AND gate 49, serve to restore the strobe part 9.

Next, signal on the input line 39f is described. The input line 39f is connected to the output line of the AND gate 51. Acoordingly, when three input signals of the AND gate 51 all become H level, the signal on the input line 39f becomes H level. The condition that all the three input terminals of the AND gate 51 becomes H level is that output signal of the D-flip-flop 34, the output signal of the AND gate 46 and the output signal of the inverter 58 are all H level. In case that the output signal of the D-flip-flop 34 becomes H level (when automatic flash-ready signal 25 is H level), the brightness signal 27 is L level (when the objective scenery brightness is high), charge finish signal 28 is H level and the strobe switch/flash position signal 29 is also H level, then the AND gate 51 issues H level signal. This condition corresponds the case that after the strobe part 9 has been protruded, thereafter the objective scenery brightness changes higher thereby making a necessity of the strobe flashing be lost. And in such case, the motor 1 is driven and therefore the strobe part 9 is restored in the camera body 9'.

As has been above-described, the camera has a function that, even when the charge finish signal is low level, the strobe part 9 is restored upon an increasing of objective scenery brightness when the strobe switch/flash position signal 29 is H. However, it is general that the power source of a camera is common for the strobe part and light measuring part, in view of small space of the camera. And in such common use of the power source, care should be taken to assure an accurate measurement of the brightness without adverse influence of power source voltage fluctuation due to large current consumption in charging a large capacity strobe capacitor. Accordingly in the camera in accoreance with the present invention, the charge finish signal 28 is used to prohibit brightness measuring circuit issuing its output to the AND gate 51, thereby to prevent undesirable maloperation due to inaccurate brightness measuring under fluctuating power source voltage.

Next, signal on the input line 39g is described. The input line 39g is connected to the output terminal of the AND gate 53.

A condition which makes output signal of the AND gate 53 in H level by making its two input signals H level is that on one hand strobe motion signal 30 is given to one of the input terminal of the AND gate 53, and on the other hand film rewind signal 31 is given to the other input terminal, thereby when the strobe part 9 is protruded and the film rewind is over, that is when the photographing of one film is over, then the motor 1 is driven to restore the strobe part 9.

That is, in a camera having an automatic film rewinding function, a finishing of the film rewind means a finishing of the photographing. In other words, no more photographing can be made, therefore if the strobe part 9 is protruded the motor 1 is driven to restore it into the camera body 9'.

Next, the signal on input line 39h is described. The input line 39h is connected to the output terminal of the delay circuit 66. Accordingly when the delay circuit 66 issues H level output to the input line 39h, then it is then given to the AND gate 54, and accordingly the motor 1 is driven. As mentioned above, the lens hood covering signal 22, the manual flash signal 26, the brightness signal 27 and the strobe switch/flash position signal 29 are given selectively to the above-mentioned AND gates 49, 50, 51 and 53, and this group of AND gates detects the restoration of the strobe part and causes the electric motor to rotate. The operation of the delay circuit 66 is that, as has been described, by becoming H level of the output signal of the NOR gate 43, its resetting is released. Therefore, after a predetermined time from the releasing, which predetermined time is decided by a signal given to the clock terminal CL, for instance, about 200 m sec., an H level signal is issued upon inputting of an H signal to its input terminal thereafter.

Input terminals of the NOR circuit 43 are connected to the output terminal of the delay circuit 65 and the output terminal of the inverter 61. Accordingly, during existence of the strobe motion signal 30, an H level output is issued when the strobe switch/flash position signal 29 is issuing L level.

Accordingly, the condition that the output of the delay circuit 66 becomes H is that the output of the NOR gate 43 is H level for more than about 200 m sec. And such condition in actual operation is a retention of L level of the strobe switch/flash position signal 29 for more than about 200 m sec. under H level of the strobe motion signal, that corresponds to that the strobe part 9 is being pushed down towards the restoring position for more than about 200 m sec. When the above conditions are fulfilled and the delay circuit 66 issues H level signal, then as has been described the motor 1 is rotated to restore the strobe part 9.

The above-mentioned about 200 m sec. delay time is designed for the purpose that, when the strobe part is accidentally pushed down without intension of restoring it, to prevent an actual restoring of the strobe part based on becoming L level of the strobe switch/flash position signal 29 and becoming H level of strobe motion signal 30. And the above-mentioned about 200 m sec. is experimentally selected to eliminate such accidental touching which is generally in a very short time. And by setting the about 200 m sec. for the necessary retention of the manual pushing down of the strobe part for initiation of the restoring motion, only the intentional manual pushing is selected. This operation is also useful for unconscious behavior of a camera user who generally is accustomed to pushing down the strobe part manually into the camera in the conventional camera, where such manual pushing down generally lasts about 300 m sec.

A timer 67 is provided in order to coupe with the following possible trouble-operation. That is, in the foregoing operation, when the circuit 66 issues H level output, the strobe switch/flash position signal 29 is in L level. Accordingly, for instance, the camera is set in a manual protrusion operation where the manual flash signal 26 is in H level, and the AND gate 48 issues H level signal as has been described, thereby to drive the motor 1. Accordingly even the strobe part 9 is pushed down and once the strobe part is restored in the camera, immediately an undesirable protruding operation takes place. Furthermore, in such case, if the strobe part 9 being kept pressed, and once the manual flash signal 26 is made H level, then the output of the S-R-flip-flop 36 is kept in H level, and the motor 1 undesirably continues to rotate.

It would be considered that the above-mentioned trouble may be prevented by configurating the circuit to reset S-R-flip-flop 36 at the timing of pushing down of the strobe part, to make its output L level. But in the example of FIG. 1 and FIG. 2, the actuation of the delay circuit 66 should exist also in a normal operation of the strobe part. Accordingly, if a simple resetting of the delay circuit 66 by the L level signal of the strobe switch/flash position signal 29 is made, there arise another trouble that stopping of the strobe part 9 at the protruded position in a manual protruding operation can not be obtained. Considering the above-mentioned problem, the circuit of FIG. 2 adopted, a timer circuit 67 is provided to perform such a function that the resetting of the S-R-flip-flop 36 by the strobe switch/flash position signal 29 is prohibited to wait until the strobe part 9 is completely protruded out of the restored position. And in that waiting, the output of the timer circuit 67 is kept L level, thereby to keep the output of the AND gate 52 in L level. Since the moving time period of the strobe part 9 depends on the voltage of the power source, and accordingly may vary considerably, the above-mentioned delay period is experimentally selected considering the variation.

Furthermore, since the operation of the timer circuit 67 should be stopped once the strobe part 9 reaches the protruded position. Accordingly the circuit is configurated such that, after once reaching the protruded position and the strobe switch/flash position signal 29 becomes L level, output terminal of the timer circuit 67 is immediately turned to H level by receiving a signal from the delay circuit 64 through the inverter 60 and the NOR gate 41, thereby to feed a reset signal to the S-R flip-flop 36. The above-mentioned trouble eliminating circuit essentially comprises the combination of the timer circuit 67, the delay circuits 64, 65 and 66 and NOR gate 41.

As has been described in detail with reference to the accompanying drawings, which show the preferred embodiment, the camera with the automatic strobe in accordance with the present invention, adopts a configuration that the motion of the strobe part is not fixedly linked with the motor rotation, but linked through two energizing means which allow manual operaiton of the strobe part irrespective of motor rotation without fear of damaging the mechanical linkage. And by adopting the cam, only a single direction rotation of the motor can push up and pull down the strobe part out of and into the camera body, thereby simplifying the motor driving circuit.

Furthermore the present camera can control the protrusion and restoration of the strobe part, utilizing many kind of sensed input signals such as objective scenery brightness signal, lens hood covering signal, manual flash signal, charge finish signal, etc. which are connected with actual situations of photographing. Thereby a necessary flashing or unnecessary protruding of the strobe part, etc. can be prevented.

What is claimed is:

1. A camera with automatic strobe having a strobe part which is automatically driven between a ready position where the strobe part is protruded out of a camera body for a flashing and a restored position where the strobe part is restored in the camera body when it is not used, comprising:
   a first energizing member for driving said strobe part in a direction to protrude out of a camera body,
   a second energizing member for driving said strobe part to restore into said camera body surpassing a force of said first energizing member,
   a driving lever fulcrumed on said camera body in a manner that a first part thereof being energized in a predetermined direction by said second energizing member and a second part thereof being abutting a receiving part of said strobe part thereby to energize said strobe part in a direction to restore it into said camera body,
   an electric motor rotating in a predetermined rotary direction,
   a cam which is to be rotated by said electric motor, thereby to drive said driving lever against said energizing force of said second energizing member, to allow a restoration of said strobe part into said camera body by the force of said second energizing member at a first predetermined rotary phase of said cam, and to allow a protrusion of said first energizing member at a second predetermined rotary phase period of said cam,
   a reversing-prohibition means which prohibit reversing rotation of said cam when said strobe part reaches said protruded position,
   a lever stopping means which prohibit motion of said lever in a direction opposite to said predetermined direction when said strobe part is in said restored position, and a motor drive control circuit for actuating said motor responding to plural input signals of photographic condition.

2. A camera with automatic strobe in accordance with claim 1, wherein said motor driving circuit comprises:

a motor driving power circuit which makes said motor to rotate at reception of a high level signal, and a motor drive control circuit which comprises a network of logic gates which logically operate the following input signals, to produce a control signal for said motor driving power circuit: lens hood covering signal which corresponds to covering of lens hood, release-button half-push signal, self-timer operating signal, manual mode selection signal corresponding to an intentional selection of flashing, brightness signal, power source reset signal and strobe switch/flash position signal.

3. A camera with automatic strobe in accordance with claim 2, wherein said motor drive control circuit comprises:

signal retention circuits for retaining said inputs signals for predetermined time periods, a first plural AND gates group to selectively receive strobe motion signal, said lens hood covering signal, said release-button half-push signal, said self-timer operating signal, said manual mode selection signal, said brightness signal and said strobe switch/flash position signal through said signal retention circuits, to produce a signal to control timing of protruding said strobe part, a second plural AND gates group to selectively receive said lens hood covering signal, said manual mode selection signal, said brightness signal, said strobe switch/flash position signal through said signal retention circuits, to produce a signal to control timing of restoration of said strobe part, and a logic sum gate which receives all output signals of said first plural AND gates group and said second plural AND gates group, to produce a signal to be given to said motor driving power circuit.

4. A camera with automatic strobe in accordance with claim 3, wherein said motor drive control circuit further comprises:

a prohibition circuit which receives output signal of said logic sum gate and a prohibition signal from a prohibition control circuit, to prohibit transmission of said output signal of said logic sum gate to said motor driving power circuit.

* * * * *